(12) United States Patent
Nagasawa

(10) Patent No.: US 12,545,330 B2
(45) Date of Patent: Feb. 10, 2026

(54) VEHICLE BODY FRONT STRUCTURE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 412 days.

(21) Appl. No.: 18/469,966

(22) Filed: Sep. 19, 2023

(65) Prior Publication Data

US 2024/0109592 A1 Apr. 4, 2024

(30) Foreign Application Priority Data

Oct. 4, 2022 (JP) ................. 2022-160599

(51) Int. Cl.
*B62D 21/03* (2006.01)
*B62D 21/15* (2006.01)

(52) U.S. Cl.
CPC ........... *B62D 21/155* (2013.01); *B62D 21/03* (2013.01)

(58) Field of Classification Search
CPC .............................. B62D 21/155; B62D 21/03
See application file for complete search history.

(56) References Cited

U.S. PATENT DOCUMENTS

| | | | | |
|---|---|---|---|---|
| 6,899,195 B2 * | 5/2005 | Miyasaka | ............ | B62D 21/152 |
| | | | | 180/312 |
| 6,957,846 B2 * | 10/2005 | Saeki | .................. | B62D 21/152 |
| | | | | 296/187.1 |
| 7,883,113 B2 * | 2/2011 | Yatsuda | ............... | B62D 25/082 |
| | | | | 180/311 |
| 8,596,711 B2 * | 12/2013 | Yasui | .................. | B62D 25/082 |
| | | | | 296/187.1 |
| 8,794,646 B1 * | 8/2014 | Onishi | ..................... | B60G 7/02 |
| | | | | 296/203.02 |
| 8,894,129 B2 * | 11/2014 | Katou | .................. | B62D 21/155 |
| | | | | 296/187.03 |
| 9,821,850 B2 * | 11/2017 | Tsukada | .................... | B60K 1/04 |
| 10,435,076 B2 * | 10/2019 | Huang | .................. | B62D 21/02 |
| 10,967,905 B2 * | 4/2021 | Okamoto | .............. | B62D 21/11 |
| 11,198,473 B2 * | 12/2021 | Okamoto | .............. | B62D 21/11 |

(Continued)

FOREIGN PATENT DOCUMENTS

JP 2020-083144 A 6/2020

*Primary Examiner* — Aaron L Lembo
(74) *Attorney, Agent, or Firm* — Smith, Gambrell & Russell, LLP

(57) ABSTRACT

A vehicle body front structure includes front side frames, sub-frames, a cross member, columnar frames, and bracket frames. Each columnar frame is circular columnar shaped, extends toward a vehicle lower side, and sandwiches a corresponding one of the front side frames between the cross member and an end portion of the columnar frame on a vehicle upper side. The bracket frames extend in a vehicle front-rear direction. Each bracket frame couples an end portion of a corresponding one of the sub-frames on a vehicle front side to the end portion of a corresponding one of the columnar frames on the vehicle upper side. Each sub-frame includes a fragile portion that is closer to a vehicle front than the corresponding columnar frame on an outer side in a vehicle width direction. Each columnar frame is coupled to the corresponding sub-frame on a vehicle rear side of the fragile portion.

1 Claim, 7 Drawing Sheets

(56) References Cited

U.S. PATENT DOCUMENTS

| | | | |
|---|---|---|---|
| 11,565,578 B2* | 1/2023 | Shimizu | B60K 1/04 |
| 11,584,443 B2* | 2/2023 | Anzai | B62D 27/02 |
| 11,661,021 B2* | 5/2023 | Iwamoto | B60R 19/18 |
| | | | 293/102 |
| 12,233,798 B2* | 2/2025 | Wada | B62D 21/152 |
| 2005/0012362 A1* | 1/2005 | Patberg | B62D 21/02 |
| | | | 296/203.01 |
| 2011/0316295 A1* | 12/2011 | Yamada | B62D 21/11 |
| | | | 293/132 |
| 2012/0242113 A1* | 9/2012 | Yasuhara | B62D 21/11 |
| | | | 296/193.07 |
| 2016/0236718 A1* | 8/2016 | Tatsuwaki | B60R 19/34 |
| 2017/0057547 A1* | 3/2017 | Taguchi | B62D 21/11 |
| 2018/0339732 A1* | 11/2018 | Takii | B62D 27/023 |
| 2020/0047696 A1* | 2/2020 | Atsumi | B62D 25/084 |
| 2020/0101914 A1* | 4/2020 | Sakai | B62D 21/155 |
| 2020/0353985 A1* | 11/2020 | Zeitouni | B62D 21/152 |
| 2022/0153352 A1* | 5/2022 | Mukaigawa | B62D 21/152 |
| 2023/0303177 A1* | 9/2023 | Yamanaka | B62D 21/152 |

* cited by examiner

VEHICLE BODY FRONT STRUCTURE

CROSS-REFERENCE TO RELATED APPLICATIONS

The present application claims priority from Japanese Patent Application No. 2022-160599 filed on Oct. 4, 2022, the entire contents of which are hereby incorporated by reference.

BACKGROUND

The disclosure relates to a vehicle body front structure.

Generally, an effective way to reduce damage to occupants of a vehicle in a frontal collision of the vehicle is to prevent deformation of a cabin which is a space for the occupants. There are various ways to prevent such deformation.

For example, a mechanism that allows a structure disposed forward of the cabin to absorb collision energy has been widely used in recent years.

When the vehicle is a hybrid vehicle or an electric vehicle, a battery pack serving as a power source for the vehicle may be mounted on a floor surface at the bottom of the cabin.

The battery pack stores power for driving the vehicle. If, for example, a frontal collision of the vehicle causes deformation of, or a wire break in, the battery pack, an abnormal reaction may occur abruptly.

Accordingly, there has been a growing demand for hybrid vehicles and electric vehicles having a mechanism that can prevent deformation of the cabin to protect the battery pack from damage.

In response to such a demand, for example, Japanese Unexamined Patent Application Publication (JP-A) No. 2020-083144 discloses a technique in which if a vehicle equipped with batteries, such as a hybrid vehicle or an electric vehicle, receives the impact of a frontal collision, the deformation of front side members caused by the impact is controlled to absorb the collision energy and protect a driving motor at the front of the vehicle.

SUMMARY

An aspect of the disclosure provides a vehicle body front structure. The vehicle body front structure includes front side frames in a pair, sub-frames in a pair, a cross member, columnar frames, and bracket frames. The frames extend in a vehicle front-rear direction on both sides of a front of a vehicle in a vehicle width direction. The sub-frames are disposed on a vehicle lower side of the front side frames and extends in the vehicle front-rear direction on both sides of the vehicle in the vehicle width direction. The cross member extends in the vehicle width direction on a vehicle front side of the vehicle and is coupled to the front side frames. The columnar frames have a circular columnar shape, and extend toward a vehicle lower side of the vehicle. Each of the columnar frames is disposed to sandwich a corresponding one of the front side frames between the cross member and an end portion of each of the columnar frames on a vehicle upper side of the vehicle. The bracket frames extend in the vehicle front-rear direction. Each of the bracket frames couples an end portion of a corresponding one of the sub-frames on the vehicle front side to the end portion of a corresponding one of the columnar frames on the vehicle upper side. Each of the sub-frames includes a fragile portion on an outer side of each of the sub-frames in the vehicle width direction. The fragile portion is closer to the front of the vehicle than the corresponding one of the columnar frames. Each of the columnar frames is coupled to the corresponding one of the sub-frames on a vehicle rear side of the fragile portion.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 4A is a plan view of the vehicle body front structure before a collision, and FIG. 4B and FIG. 4C are plan views chronologically illustrating deformation in a frontal collision; FIG. 5A is a plan view of the vehicle body front structure before a collision, and FIG. 5B and FIG. 5C are plan views chronologically illustrating deformation in a frontal collision.

DETAILED DESCRIPTION

Figure 1:
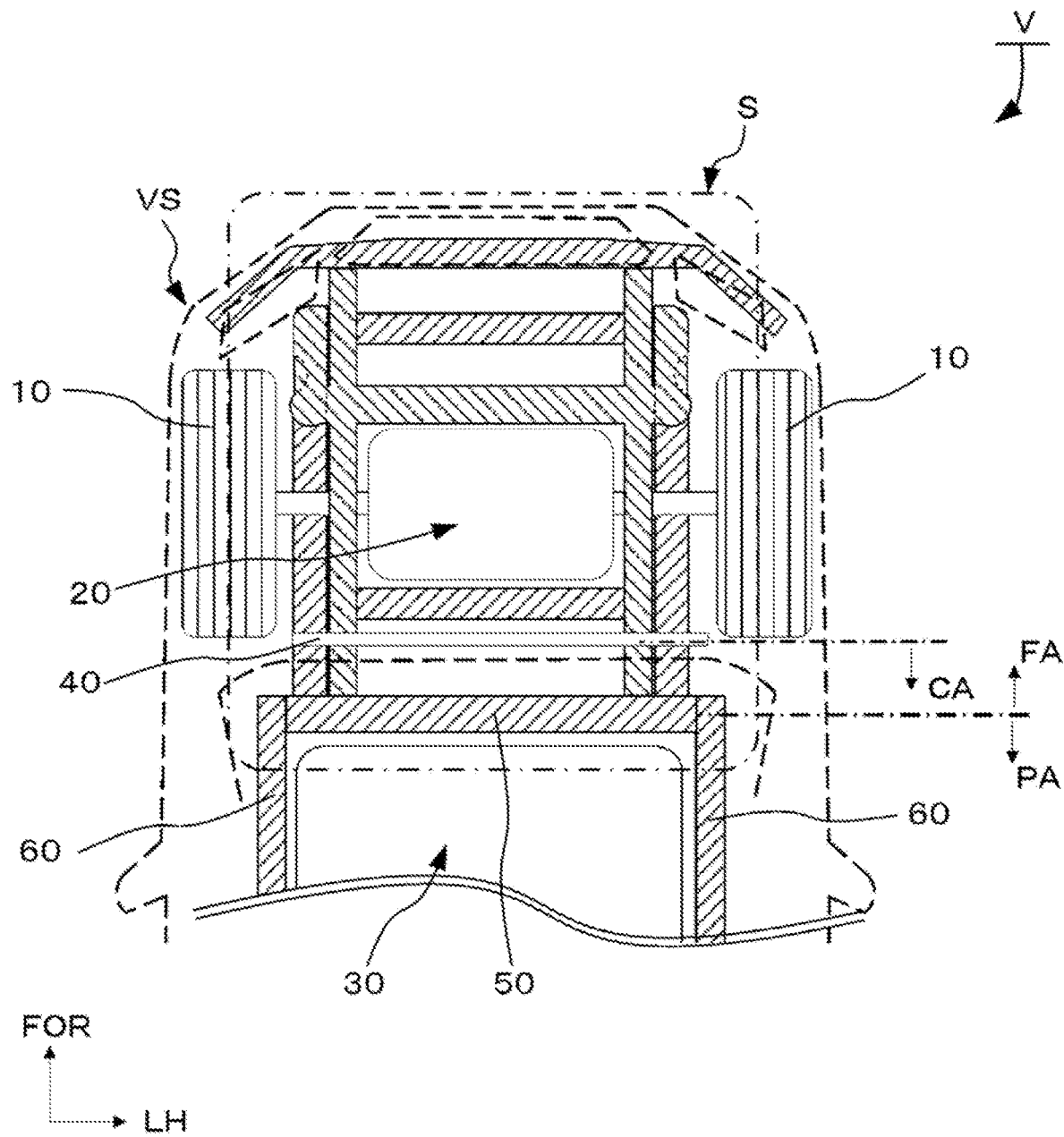
FIG. 1 is a diagram of a vehicle according to an embodiment of the disclosure, as viewed from above.

In a frontal collision of a vehicle, various types of collisions are to be taken into consideration. Examples of the types of collisions include a full-wrap collision in which the entire front of the vehicle collides with a colliding body, an offset collision in which one side of the front of the vehicle collides with a colliding body, and a small overlap collision having an offset of about 25%.

Accordingly, there is a demand for a mechanism in which a structure disposed forward of a cabin or a battery pack absorbs collision energy, in each type of collision, to prevent deformation of the cabin and the battery pack.

The technique proposed in JP-A No. 2020-083144 includes a mechanism in which fragile portions of a cross member allow the front side members on both sides of the vehicle to bend inward in the vehicle width direction to reliably absorb collision energy generated in each type of collision.

However, the technique described in JP-A No. 2020-083144 does not deal with a shock absorbing structure that protects a cabin or a battery pack disposed rearward of the cross member. The problem here is that the cabin or the battery pack may be deformed if collision energy is transmitted to parts of the front side members rearward of the fragile portions, on both sides of the vehicle.

It is desirable to provide a vehicle body front structure that can prevent deformation of the cabin and the battery pack in various types of frontal collisions.

A vehicle V including a vehicle body front structure S according to an embodiment of the disclosure will now be described with reference to FIG. 1 to FIGS. 5A to 5C. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. In the drawings, arrow FOR indicates a forward (or frontward) direction of the vehicle V illustrated in FIG. 1, arrow UP indicates an upward direction as viewed from the front, and arrow LH indicates a leftward direction as viewed from the front. In the following description, the terms "up", "down", "front", "rear", "right", and "left" refer to an up-down direction, a front-rear direction, and a right-left direction, as viewed from the front, unless otherwise stated.

Embodiment

A configuration of the vehicle body front structure S according to the present embodiment will now be described with reference to FIG. 1 to FIG. 3.
<Configuration of Vehicle V>
The vehicle V is, for example, an electric vehicle that includes a power unit 20 as a driving source. The vehicle V may be a hybrid electric vehicle that includes an engine and the power unit 20 as driving sources.

As illustrated in FIG. 1, the vehicle V includes, in a vehicle body VS, front wheels 10, the power unit 20, a battery pack 30, a toe board 40, a torque box 50, side sills 60, and the vehicle body front structure S (hatched area enclosed by a dash-dot line in FIG. 1).

The power unit 20 is a driving device configured to drive the front wheels 10 and includes a motor, a transmission, a clutch, and drive axles (not illustrated). The power unit 20 is installed in a space defined by front side frames 100 and a cross member 110 (described below). The power unit 20 is secured in place on the upper side of the front side frames 100.

The battery pack 30 is in the shape of, for example, a flat box. The battery pack 30 includes therein many battery cells connected in series. The battery pack 30 is capable of outputting a high voltage to be supplied to the power unit 20, and is configured to store power for running the vehicle V. The battery pack 30 is installed in a space defined by robust frames, such as the torque box 50 and the side sills 60 (described below). The battery pack 30 is used in vehicles, such as electric vehicles (EVs) and hybrid electric vehicles (HEVs).

The toe board 40 is a partition wall raised in the up-down direction on the vehicle front side of a cabin CA. The toe board 40 separates the cabin CA from a front wheel driving device of the vehicle V. The toe board 40 is coupled, for example by welding, to the upper side of rear parts of the front side frames 100 (described below).

The torque box 50 is interposed between the front side frames 100 and the side sills 60 (described below) and configured to couple the front side frames 100 to the side sills 60. The torque box 50 is a framework extending in the vehicle width direction on the bottom surface of the vehicle V. The torque box 50 is coupled, for example by welding, to one end portions of the front side frames 100 on both sides of the torque box 50 in the vehicle width direction. The torque box 50 is made of, for example, high rigidity metal and has a substantially rectangular closed cross-sectional shape. The torque box 50 is located forward of the battery pack 30. End portions of the torque box 50 are coupled, for example by welding, to one end portions of the side sills 60 on both sides of the torque box 50 in the vehicle width direction.

The one end portions of the front side frames 100 on both sides of the torque box 50 (described below) in the vehicle width direction are coupled, for example by welding, to the vehicle front and upper sides of the torque box 50.

A protective region PA is on the vehicle rear side of the torque box 50. The protective region PA is a region that prevents deformation of the cabin CA located on the vehicle upper side of the protective region PA and the battery pack 30 located on the vehicle lower side of the protective region PA.

The side sills 60 are disposed on lateral bottom surfaces on both sides of the vehicle V in the vehicle width direction. The side sills 60 are a framework that extends in the vehicle front-rear direction. The side sills 60 are made of, for example, high rigidity metal and have a substantially rectangular closed cross-sectional shape. The side sills 60 constitute bases on both sides of the protective region PA.

The vehicle body front structure S is disposed inside a vehicle front compartment FA on the vehicle front side of the torque box 50. The configuration of the vehicle body front structure S will be described below.
<Configuration of Vehicle Body Front Structure S>
The vehicle body front structure S according to the present embodiment will now be described with reference to FIG. 2 and FIG. 3.

The vehicle body front structure S has right-left symmetry in the vehicle width direction.

Figure 2:
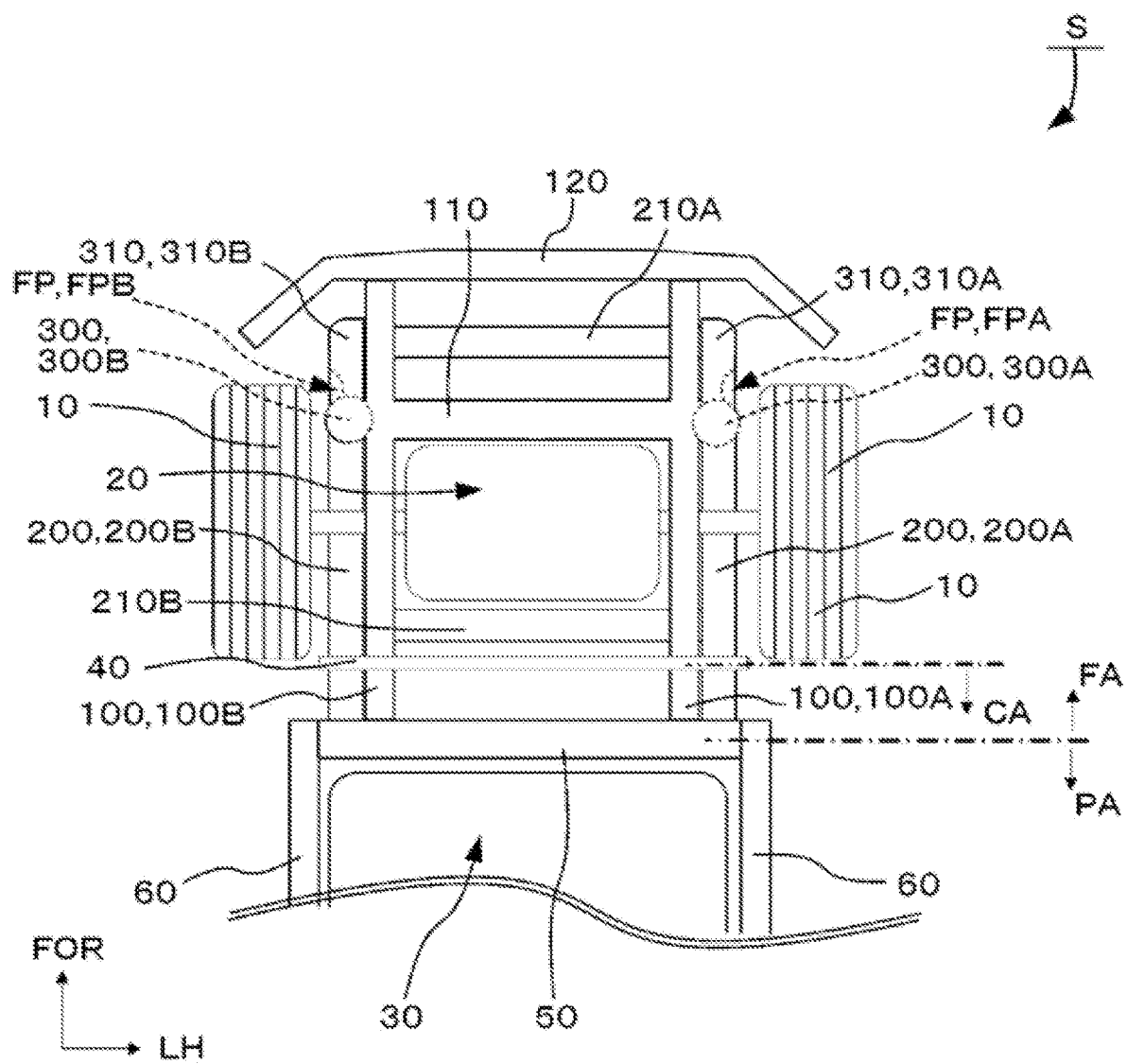
FIG. 2 is a diagram of a vehicle body front structure illustrated in FIG. 1, as viewed from above.

As illustrated in FIG. 2, the vehicle body front structure S includes the front side frames 100 (front side frames 100A and 100B), the cross member 110, a bumper beam 120, sub-frames 200 (sub-frames 200A and 200B), sub-cross members 210A and 210B, columnar frames 300 (columnar frames 300A and 300B), and bracket frames 310 (bracket frames 310A and 310B).
(Front Side Frame 100)
The front side frames 100 are disposed to form a pair on both sides of the vehicle front in the vehicle width direction. The front side frames 100 are located on the vehicle upper side of the power unit 20 that drives the front wheels 10 of the vehicle V, and extend in the vehicle front-rear direction. The front side frames 100 constitute a framework of the vehicle V. The front side frames 100 are made of, for example, high rigidity metal and have a substantially rectangular closed cross-sectional shape. End portions of the front side frames 100 on the vehicle front side are coupled, for example by welding, to the bumper beam 120, and end portions of the front side frames 100 on the vehicle rear side are coupled, for example by welding, to the torque box 50.
(Cross Member 110)
The cross member 110 extends in the vehicle width direction on the vehicle front side of the power unit 20. Both end portions of the cross member 110 are coupled, for example by welding, to the front side frames 100 on both sides in the vehicle width direction. The cross member 110 is made of, for example, metal and has a substantially rectangular closed cross-sectional shape.

(Bumper Beam 120)

The bumper beam 120 extends in the vehicle width direction on the vehicle front side and constitutes a framework on the vehicle front side. The bumper beam 120 is made of, for example, metal and has a substantially rectangular closed cross-sectional shape. The bumper beam 120 is coupled, for example by welding, to front end portions of the front side frames 100 on both sides in the vehicle width direction. End portions of the bumper beam 120 on both sides in the vehicle width direction are bent toward the vehicle rear side.

(Sub-Frame 200)

Figure 3:
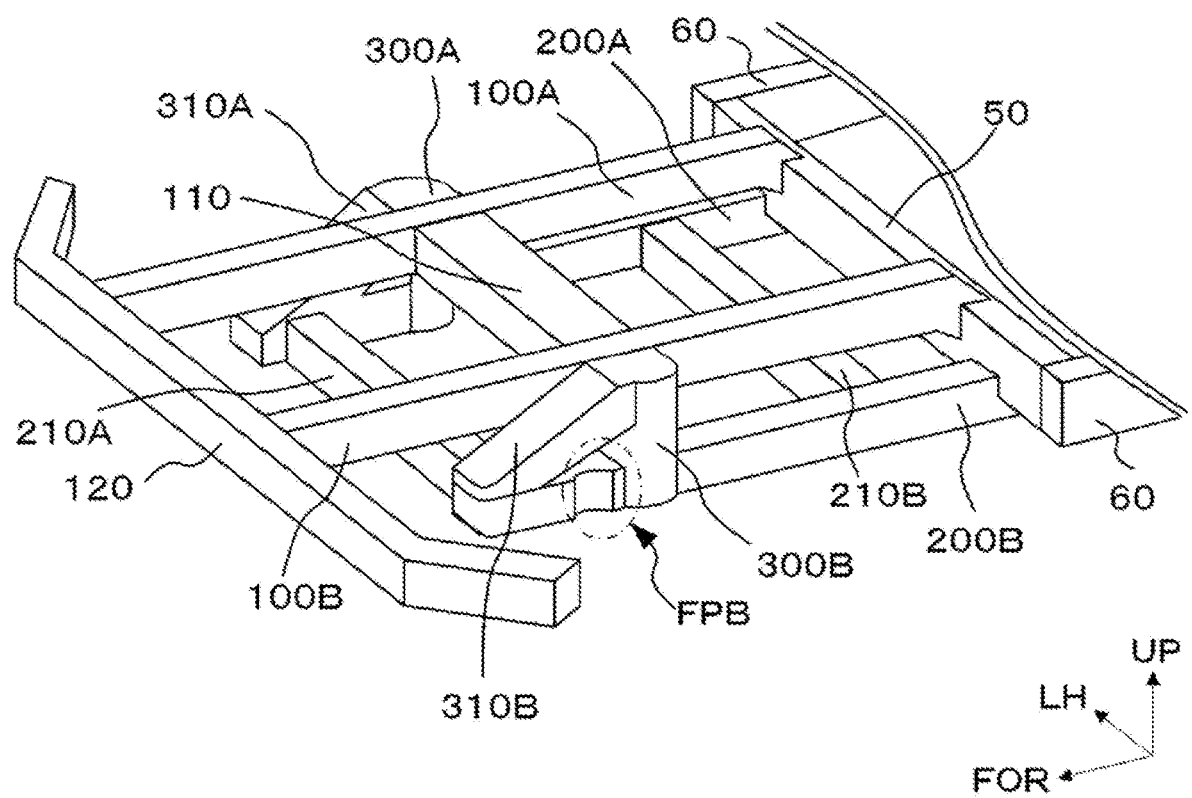
FIG. 3 is a perspective view of the vehicle body front structure illustrated in FIG. 2, with a power unit, front wheels, and a toe board removed, as viewed from above.

As illustrated in FIG. 3, the sub-frames 200 are disposed to form a pair on both sides in the vehicle width direction on the vehicle lower side of the front side frames 100, and extend in the vehicle front-rear direction. The sub-frames are made of, for example, high rigidity metal and have a substantially rectangular closed cross-sectional shape. The sub-frames 200 are rounded at outer ends thereof on the vehicle front side.

The sub-frames 200 are disposed in such positions that even in the event of a small overlap collision from the vehicle front side, the sub-frames 200 can receive the collision at the end portions thereof on the vehicle front side. For example, the center of the end of each of the sub-frames 200A and 200B on the vehicle front side is located at a distance of within 25% inward from the edge of the vehicle V in the vehicle width direction. The outer side of each of the sub-frames 200 on the vehicle front side has a recessed fragile portion FP (fragile portion FPA or FPB) located on the vehicle front side of the columnar frame 300 (described below).

(Sub-Cross Members 210A and 210B)

The sub-cross members 210A and 210B extend in the vehicle width direction between the sub-frames 200 on both sides in the vehicle width direction. The sub-cross member 210A is disposed between the sub-frames 200 on the vehicle front side, and the sub-cross member 210B is disposed between the sub-frames 200 on the vehicle rear side. The sub-cross members 210A and 210B are made of, for example, metal and have a substantially rectangular closed cross-sectional shape. The sub-cross members 210A and 210B are each coupled at end portions thereof, for example by welding, to the sub-frames 200 on both sides in the vehicle width direction.

(Columnar Frame 300)

The columnar frames 300 have a circular columnar shape, extend in the vehicle downward direction, and are each disposed to sandwich the front side frame 100A or 100B between the cross member 110 and the end portion of the columnar frame 300 on the vehicle upper side. The columnar frames 300 are made of, for example, metal and have a substantially circular closed cross-section. The columnar frames 300 are each internally coupled on the vehicle upper side, for example by welding, to the vehicle outer side of the front side frame 100 in the vehicle width direction. The columnar frames 300 are each coupled, for example by welding, to the sub-frame 200 on the vehicle rear side of the fragile portion FP of the sub-frame 200.

(Bracket Frame 310)

The bracket frames 310 are each configured to couple the end portion of the sub-frame 200 on the vehicle front side to the end portion of the columnar frame 300 on the vehicle upper side. The bracket frames 310 are rod-shaped members made of, for example, metal and have a substantially rectangular closed cross-section. The bracket frames 310 are each coupled to the end portion of the columnar frame 300 on the vehicle upper side, and coupled on the vehicle lower side thereof, for example by welding, to the end portion of the sub-frame 200 on the vehicle front side. The bracket frames 310 each form a slope that extends downward from the joint with the columnar frame 300 toward the joint with the end portion of the sub-frame 200 on the vehicle front side. The bracket frames 310 are rounded at outer ends thereof on the vehicle front side.

The bracket frames 310 are disposed in such positions that even in the event of a small overlap collision from the front side of the vehicle V, the bracket frames 310 can receive the collision at the front ends thereof. For example, the center of the end of each of the bracket frames 310A and 310B on the vehicle front side is located at a distance of within 25% inward from the edge of the vehicle V in the vehicle width direction.

The vehicle body front structure S forms a robust lattice-like framework by coupling together the front side frames 100, the cross member 110, the bumper beam 120, the sub-frames 200, the sub-cross members 210A and 210B, the torque box 50, and the side sills 60.

Operation and Effects

A colliding object collides with both sides of the vehicle front in a full-wrap collision, whereas in an offset collision and a small overlap collision, a colliding object collides with one side of the vehicle V in the vehicle width direction. Hereinafter, how the vehicle body front structure S according to the present embodiment, configured as described above, operates in the event of a full-wrap collision will be described with reference to FIG. 4A to FIG. 4C.

(Full-Wrap Collision)

Figure 4A:
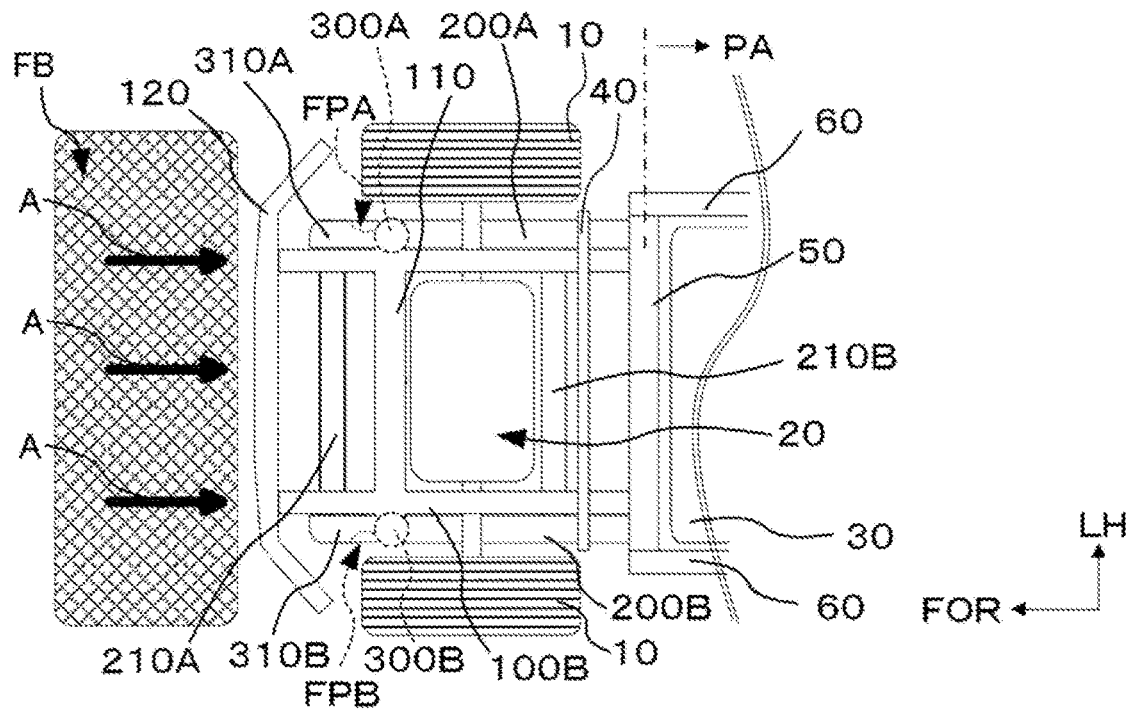
FIG. 4A to FIG. 4C are plan views illustrating how the vehicle body front structure according to the embodiment of the disclosure deforms in a full-wrap collision, as viewed from above.

In a full-wrap collision of a colliding object FB with the vehicle V, as illustrated in FIG. 4A, collision energy is generated toward the vehicle V in the direction indicated by arrows A.

Figure 4B:
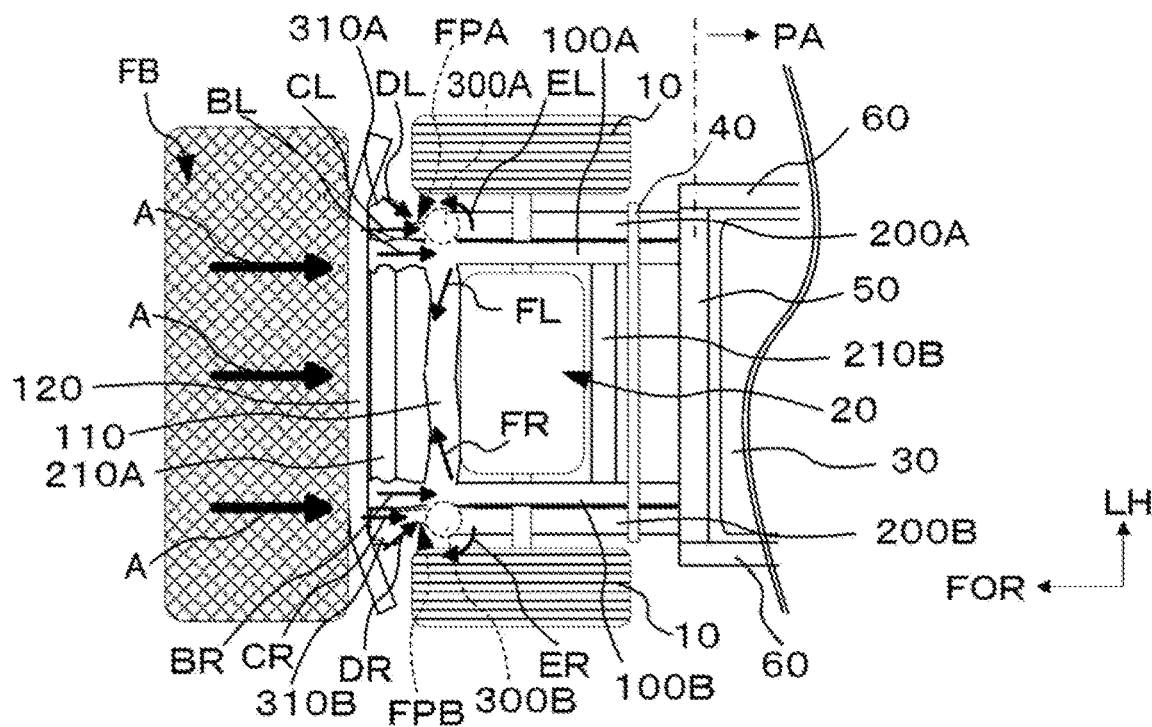

As illustrated in FIG. 4B, the collision energy from ahead of the vehicle V, indicated by arrows A, is transmitted through the bumper beam 120 to the front side frames 100 and the sub-frames 200. The collision energy in the front side frames 100 is transmitted in the direction indicated by arrows B (arrows BL and BR) from the vehicle front side toward the vehicle rear side. The collision energy, which crushes the end portions of the front side frames 100 on the vehicle front side, is absorbed by the resulting deformation of the end portions of the front side frames 100 on the vehicle front side.

As the front side frames 100 get more crushed, the collision energy in the direction of arrows C (arrows CL and CR) is transmitted in the sub-frames 200. With the bracket frames 310 disposed on the vehicle front side of the sub-frames 200, the collision energy in the direction of arrows C is transmitted through the bracket frames 310 to the vehicle upper side of the columnar frames 300. At the same time, the collision energy in the direction of arrows C is transmitted through the sub-frames 200 to the vehicle lower side of the columnar frames 300. Each of the sub-frames 200 has the fragile portion FP on the vehicle front side, and the sub-frames 200 and the bracket frames 310 are rounded at the outer ends thereof on the vehicle front side. The sub-frames 200 and the bracket frames 310 are thus bent toward the front side frames 100 and pushed in the directions indicated by arrows D (arrows DL and DR). The columnar frames 300 are pushed by the sub-frames 200 and the bracket frames 310 and rotated in the directions indicated by arrows E (arrows EL and ER). The columnar frames 300, which are caught between the colliding object FB and the front side frames 100, push the front side frames 100 and the sub-frames 200 in the directions indicated by arrows F (arrows FL and FR). The front side frames 100 push the cross member 110 in the directions indicated by arrows F to deform the cross member 110.

Figure 4C:
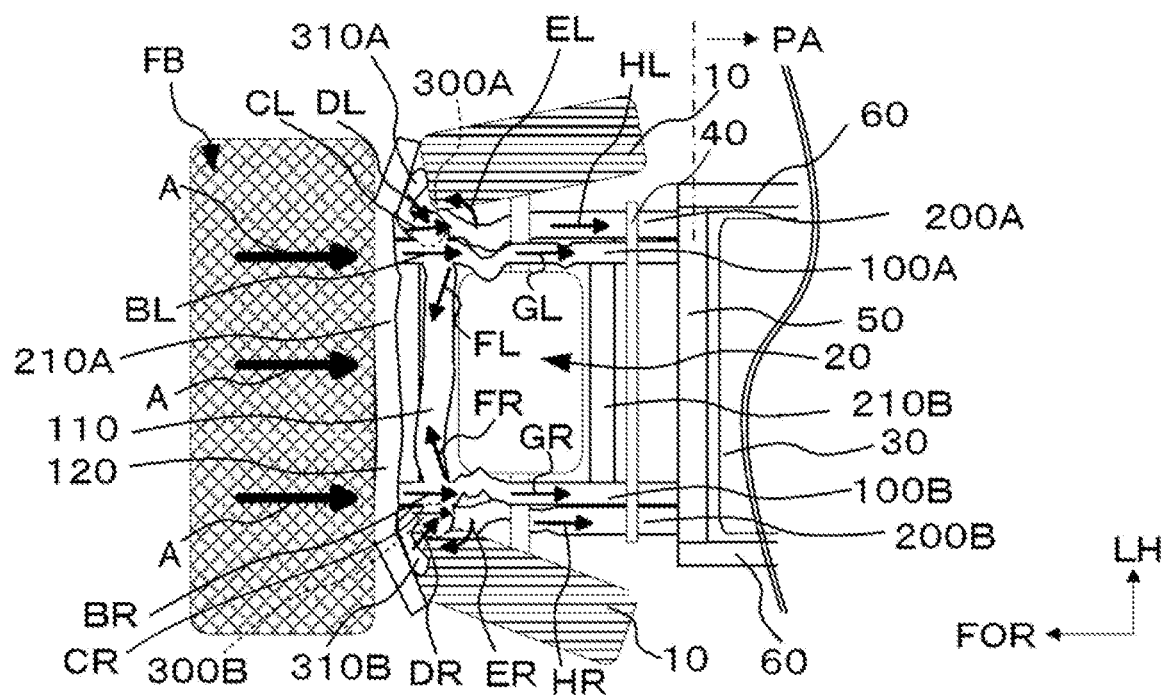

As the collision energy increases, as illustrated in FIG. 4C, the front side frames 100 and the sub-frames 200 are further crushed and deformed by the collision energy indicated by arrows B and arrows C to reach the position of the cross member 110 on the vehicle front side. The vehicle front sides of the sub-frames 200 and the bracket frames 310 are turned in the directions indicated by arrows D and the columnar frames 300 are further rotated. The columnar frames 300 are pushed in the directions of arrows C while being rotated in the directions of arrows E. This deforms the front side frames 100 and the sub-frames 200 on the vehicle rear side of the columnar frames 300. The columnar frames 300, which are caught between the colliding object FB and the front side frames 100, push the front side frames 100 and the sub-frames 200 in the directions indicated by arrows F. The cross member 110 is deformed by the collision energy indicated by arrows F. The collision energy transmitted through the front side frames 100 and the sub-frames 200, as indicated by arrows G (arrows GL and GR) and arrows H (arrows HL and HR), is dispersed to the sub-cross member 210B, the torque box 50, and the side sills 60 on the vehicle rear side.

As described above, the front side frames 100 on both sides in the vehicle width direction, the cross member 110, the sub-frames 200 on both sides in the vehicle width direction, the sub-cross members 210A and 210B, the torque box 50, and the side sills 60 are coupled together to form a robust lattice-like framework. The collision energy is thus dispersed in the lattice-like framework and absorbed by deformation of the lattice-like framework.

When the input of collision energy ends and the transmission of collision energy to the front side frames 100 also ends, the deformation of the vehicle body front structure S stops absorbing the collision energy.

(Small Overlap Collision)

In the case of a small overlap collision, the colliding object FB collides with one side of the vehicle V in the vehicle width direction, and collision energy is generated in the direction indicated by arrows SA. Hereinafter, a collision on the left side of the vehicle V, as viewed from the front, will be described with reference to FIG. 5A to FIG. 5C.

Figure 5A:
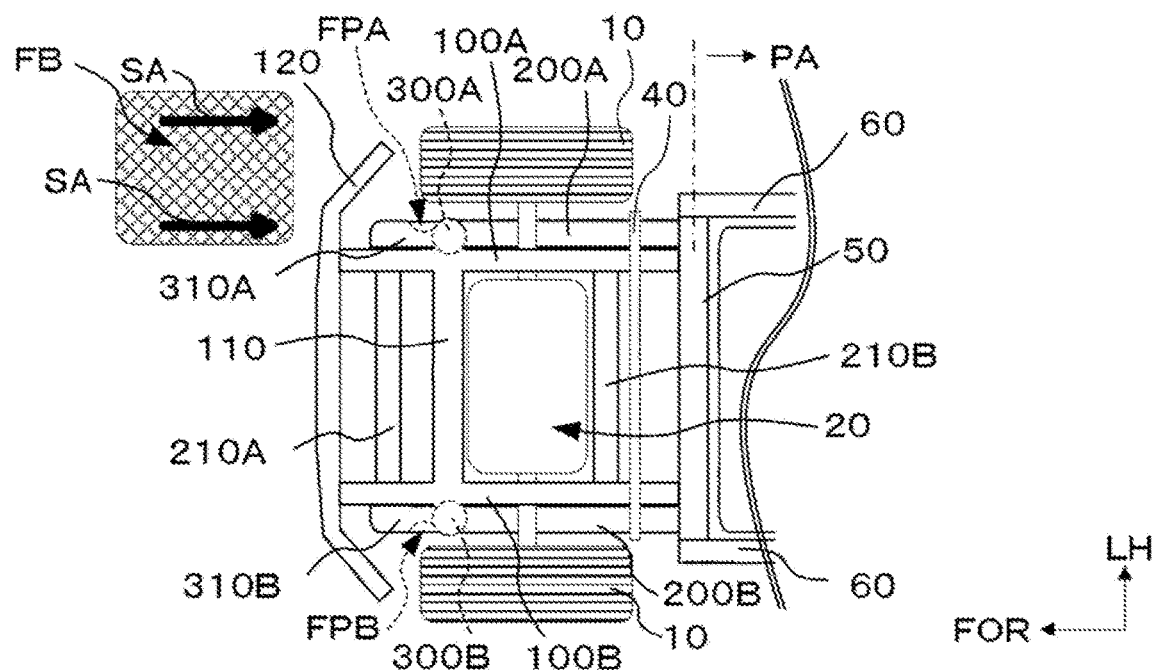
FIG. 5A to FIG. 5C are plan views illustrating how the vehicle body front structure according to the embodiment of the disclosure deforms in a small overlap collision, as viewed from above.

In the case of a small overlap collision of the colliding object FB with the vehicle V, collision energy is generated toward the vehicle V in the direction indicated by arrows SA, as illustrated in FIG. 5A.

Figure 5B:
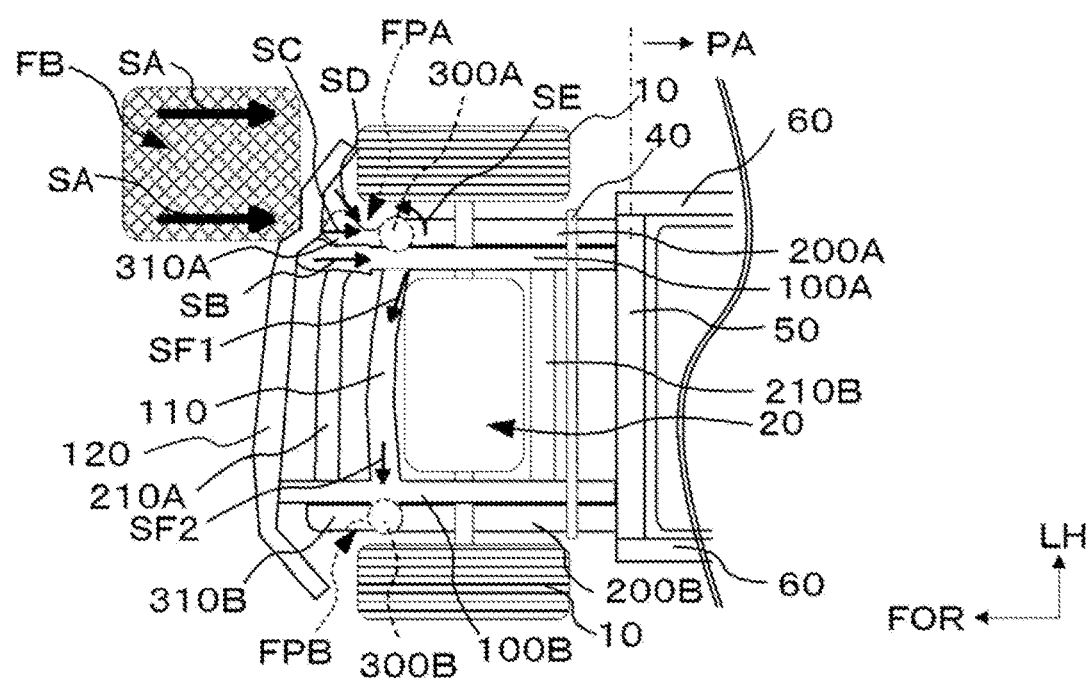

As illustrated in FIG. 5B, the collision energy generated when the colliding object FB collides (in the direction indicated by arrows SA) with the left side of the vehicle V, as viewed from the front, is transmitted through the bumper beam 120 to the front side frame 100A and the sub-frame 200A. The collision energy in the front side frame 100A, indicated by arrow SB, is transmitted from the vehicle front side toward the vehicle rear side. The collision energy is absorbed by crushing the end portion of the front side frame 100A on the vehicle front side.

As the front side frame 100A gets more crushed, the collision energy in the direction of arrow SC is transmitted in the sub-frame 200A. With the bracket frame 310A disposed on the vehicle front side of the sub-frame 200A, the collision energy in the direction of arrow SC is transmitted through the bracket frame 310A to the vehicle upper side of the columnar frame 300A. At the same time, the collision energy in the direction of arrow SC is transmitted through the sub-frame 200A to the vehicle lower side of the columnar frame 300A. The sub-frame 200A has the fragile portion FPA on the vehicle front side, and the sub-frame 200A and the bracket frame 310A are rounded at the outer ends thereof on the vehicle front side. The sub-frame 200A and the bracket frame 310A are thus bent toward the front side frame 100A and pushed in the direction indicated by arrows SD. The front side frame 100A pushes the cross member 110 in the direction indicated by arrow SF1 to deform the cross member 110. The collision energy transmitted to the cross member 110 pushes, in the direction indicated by arrow SF2, the front side frame 100B on the side opposite the side of collision. The front side frame 100B is thus deformed outward in the vehicle width direction. The columnar frame 300A is pushed in by the sub-frame 200A and the bracket frame 310A and rotated in the direction indicated by arrow SE. Then the front side frame 100A coupled to the columnar frame 300A deforms, with the columnar frame 300A in the center.

Figure 5C:
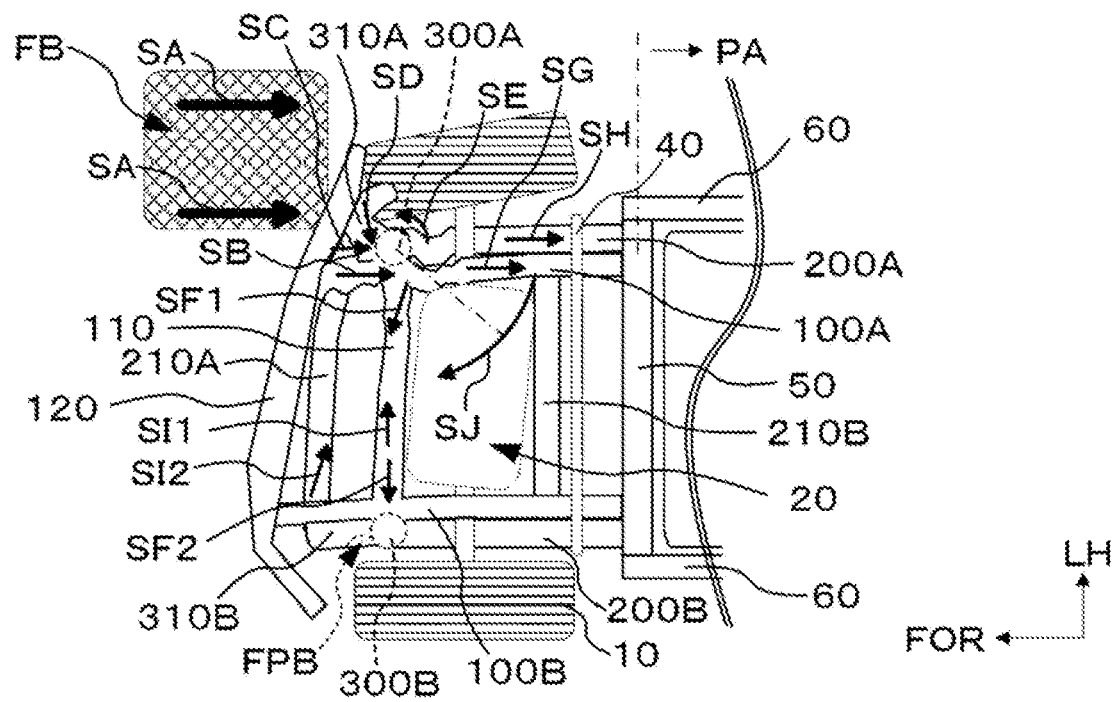

When the collision energy is larger, as illustrated in FIG. 5C, the front side frame 100A and the sub-frame 200A are further crushed and deformed by the collision energy indicated by arrow SB and arrow SC to reach the position of the cross member 110 on the vehicle front side. The vehicle front side of the sub-frame 200A and the bracket frame 310A are further pushed in the direction indicated by arrow SD, and the columnar frame 300A is rotated in the direction indicated by arrow SE. The columnar frame 300A, which is caught between the colliding object FB and the front side frame 100A, pushes the front side frame 100A and the sub-frame 200A in the direction indicated by arrow SF1. The cross member 110 is deformed by the collision energy transmitted in the direction indicated by arrow SF1. The collision energy transmitted to the cross member 110 pushes, in the direction indicated by arrow SF2, the front side frame 100B on the side opposite the side of collision. The front side frame 100B is further deformed outward in the vehicle width direction.

The collision energy transmitted through the front side frame 100A and the sub-frame 200A, as indicated by arrow SG and arrow SH, is dispersed to the sub-cross member 210B, the torque box 50, and the side sill 60. The collision energy indicated by arrow SG and arrow SH pushes the columnar frame 300A, the front side frame 100A, and the sub-frame 200A further toward the vehicle rear side. The joint between the front side frame 100B and the cross member 110 and the joint between the sub-frame 200B and the sub-cross member 210A, on the side opposite the side of collision, are pulled in the directions indicated by arrow SI1 and arrow SI2. The front side frame 100B and the sub-frame 200B begin to deform inward in the vehicle width direction. Then, the rotation of the columnar frame 300A in the direction of arrow SE, the collision energy that pushes the front side frame 100A and the sub-frame 200A toward the vehicle rear side, and the inward pulling of the front side frame 100B and the sub-frame 200B in the vehicle width direction on the side opposite the side of collision, generate a turning force in the direction indicated by arrow SJ in the vehicle body front structure S.

As described above, the front side frames 100 on both sides in the vehicle width direction, the cross member 110, the sub-frames 200 on both sides in the vehicle width direction, the sub-cross members 210A and 210B, the torque box 50, and the side sills 60 are coupled together to form a robust lattice-like framework. The collision energy is thus dispersed in the lattice-like framework and absorbed by deformation of the lattice-like framework. By rotating the columnar frame 300A in the direction of arrow SE and pushing the columnar frame 300A toward the vehicle rear side, a turning force in the direction indicated by arrow SJ is generated in the front side frame 100A, the front side frame 100B, the sub-frame 200A, and the sub-frame 200B. Thus, since the lattice-like framework is turned in the direction of arrow SJ, with the columnar frame 300A on the side of collision in the center, the protective region PA is turned in the direction away from the colliding object FB.

When the input of collision energy ends and the transmission of collision energy to the front side frames 100 also ends, the deformation of the vehicle body front structure S stops absorbing the collision energy.

The vehicle body front structure S according to the present embodiment includes a pair of front side frames 100 extending in the vehicle front-rear direction on both sides of the vehicle front in the vehicle width direction; a pair of sub-frames 200 disposed on the lower side of the front side frames 100 and extending in the vehicle front-rear direction on both sides in the vehicle width direction; the cross member 110 extending in the vehicle width direction on the vehicle front side and coupled to the front side frames 100; the columnar frames 300 having a circular columnar shape, extending toward a vehicle lower side, and each disposed to sandwich the front side frame 100 between the cross member 110 and the end portion of the columnar frame 300 on the vehicle upper side; and the bracket frames 310 extending in the vehicle front-rear direction and each configured to couple the end portion of the sub-frame 200 on the vehicle front side to the end portion of the columnar frame 300 on the vehicle upper side. The sub-frames 200 each have, on the outer side thereof in the vehicle width direction, the fragile portion FP on the vehicle front side of the columnar frame 300. The columnar frames 300 are each coupled to the sub-frame 200 on the vehicle rear side of the fragile portion FP.

The vehicle body front structure S transmits collision energy generated by a frontal collision of the vehicle V through the bumper beam 120 to the front side frames 100, the sub-frames 200, and the bracket frames 310. The sub-frames 200 and the bracket frames 310 are bent by the collision energy at the fragile portions FP, and pushed toward the front side frames 100. The columnar frames 300 transmit the collision energy to the front side frames 100 and the sub-frames 200 while rotating. The columnar frames 300, which are caught between the colliding object FB and the front side frames 100, push the front side frames 100 and the sub-frames 200 toward the cross member 110.

In the case of a full-wrap collision, the columnar frames 300 deform the front side frames 100 and the sub-frames 200 on the vehicle rear side thereof to absorb the collision energy. The collision energy transmitted to the vehicle rear side is dispersed to the cross member 110, the sub-cross members 210A and 210B, the torque box 50, and the side sills 60.

In the case of a small overlap collision, the columnar frame 300A deforms the front side frame 100A and the sub-frame 200A on the vehicle rear side thereof to absorb the collision energy. The collision energy transmitted to the vehicle rear side is dispersed to the cross member 110, the sub-cross members 210A and 210B, the torque box 50, and the side sill 60. The collision energy transmitted to the cross member 110 deforms the front side frame 100B on the side opposite the side of collision outward in the vehicle width direction. The collision energy transmitted to the front side frame 100A and the sub-frame 200A is dispersed to the sub-cross member 210B, the torque box 50, and the side sill 60. By rotating the columnar frame 300A in the direction of arrow SE and pushing the columnar frame 300A toward the vehicle rear side, a turning force in the direction indicated by arrow SJ is generated in the front side frames 100A and 100B and the sub-frames 200A and 200B.

That is, by allowing the sub-frames 200, the bracket frames 310, and the columnar frames 300 to turn and deform, the vehicle body front structure S disperses the collision energy generated by a frontal collision of the vehicle V in the robust lattice-like framework and deforms the framework to absorb the collision energy. The collision energy can thus be absorbed inside the vehicle front compartment FA. In the case of a small overlap collision, the collision energy rotates the columnar frame 300A and pushes it toward the vehicle rear side. The vehicle body front structure S can thus turn the protective region PA in a direction away from the colliding object FB.

This can prevent deformation of the cabin CA and the battery pack 30 in the protective region PA.

Although the embodiments of the disclosure have been described in detail with reference to the drawings, the specific configurations are not limited to the embodiments described above. Designs and others that do not depart from the gist of the disclosure are also included in the disclosure.

One or more embodiments of the disclosure can prevent deformation of the cabin and the battery pack in various types of frontal collisions.

The invention claimed is:

1. A vehicle body front structure comprising:
   front side frames in a pair, the front side frames extending in a vehicle front-rear direction on both sides of a front of a vehicle in a vehicle width direction;
   sub-frames in a pair, the sub-frames being disposed on a vehicle lower side of the front side frames and extending in the vehicle front-rear direction on both sides of the vehicle in the vehicle width direction;
   a cross member extending in the vehicle width direction on a vehicle front side of the vehicle and coupled to the front side frames;
   columnar frames having a circular columnar shape and extending toward a vehicle lower side of the vehicle, each of the columnar frames being disposed to sandwich a corresponding one of the front side frames between the cross member and an end portion of each of the columnar frames on a vehicle upper side of the vehicle; and
   bracket frames extending in the vehicle front-rear direction, each of the bracket frames coupling an end portion of a corresponding one of the sub-frames on the vehicle front side to the end portion of a corresponding one of the columnar frames on the vehicle upper side,
   wherein each of the sub-frames comprises a fragile portion on an outer side of each of the sub-frames in the vehicle width direction, the fragile portion being closer to the front of the vehicle than the corresponding one of the columnar frames; and
   each of the columnar frames is coupled to the corresponding one of the sub-frames on a vehicle rear side of the fragile portion.

* * * * *